(12) United States Patent
Coudert et al.

(10) Patent No.: US 11,475,197 B2
(45) Date of Patent: Oct. 18, 2022

(54) HARDWARE SIMULATION SYSTEMS AND METHODS FOR IDENTIFYING STATE-HOLDING LOOPS AND OSCILLATING LOOPS

(71) Applicant: Synopsys, Inc., Mountain View, CA (US)

(72) Inventors: Olivier Coudert, Mountain View, CA (US); Florent Duru, Marlborough, MA (US); Francois Peneloux, Marlborough, MA (US)

(73) Assignee: Synopsys, Inc., Mountain View, CA (US)

( * ) Notice: Subject to any disclaimer, the term of this patent is extended or adjusted under 35 U.S.C. 154(b) by 420 days.

(21) Appl. No.: 16/582,999

(22) Filed: Sep. 25, 2019

(65) Prior Publication Data

US 2020/0097627 A1   Mar. 26, 2020

Related U.S. Application Data

(60) Provisional application No. 62/735,930, filed on Sep. 25, 2018.

(51) Int. Cl.
*G06F 9/455* (2018.01)
*G06F 30/367* (2020.01)
(Continued)

(52) U.S. Cl.
CPC .......... *G06F 30/367* (2020.01); *G06F 30/333* (2020.01); *G06F 2119/18* (2020.01)

(58) Field of Classification Search
CPC ...... G06F 17/50; G06F 30/367; G06F 30/333; G06F 2119/18; G06F 30/33; G06F 30/3308
See application file for complete search history.

(56) References Cited

U.S. PATENT DOCUMENTS 4,769,817 A    9/1988  Krohn et al.
5,572,710 A   11/1996  Asano et al.
(Continued)

FOREIGN PATENT DOCUMENTS

JP    06290230    10/1994
JP    06290230  * 11/1994

OTHER PUBLICATIONS

Shiple et al. Constructive Analysis of Cyclic Circuits IEEE (Year: 1996).*

(Continued)

*Primary Examiner* — Rehana Perveen
*Assistant Examiner* — Cuong V Luu
(74) *Attorney, Agent, or Firm* — Weaver Austin Villeneuve & Sampson LLP

(57) ABSTRACT

A circuit hardware emulation module is configured to identify oscillating subgraphs of an emulated graph, or to identify state-holding subgraphs of an emulated graph. The emulation module identifies one or more loops within an emulated circuit; generates an acyclic emulation of at least a portion of the emulated circuit, wherein the acyclic emulation is characterized by one or more loop breakers; generates a loop detector emulation of a hardware-based loop detector circuit based at least in part on a quantity of loop breakers n characterizing the acyclic emulation, wherein the loop detector emulation comprises at least one of an oscillation detector or a state-holding detector; and executes the loop detector emulation for a plurality of input values for the emulated circuit to generate an output indicating at least one of an oscillation status or a state-holding status of the emulated circuit.

9 Claims, 12 Drawing Sheets

(51) Int. Cl.
　　　G06F 119/18　　　(2020.01)
　　　G06F 30/333　　　(2020.01)

(56) References Cited

U.S. PATENT DOCUMENTS

| | | |
|---|---|---|
| 8,181,129 B2 | 5/2012 | Gupta et al. |
| 2009/0044157 A1* | 2/2009 | Gupta ................ G06F 30/35 716/103 |

OTHER PUBLICATIONS

Gupta, et al., "Acyclic modeling of combinational loops," IEEE/ACM International Conference on Computer-Aided Design, Digest of Technical Papers, ICCAD, pp. 343-347, 10.1109/ICCAD.2005.156009, (2005).

"Oscillation errors," Logisim, a graphical tool for designing and simulating logic circuits, cburch.com/logisim/docs/2.5.01/en/guide/prop/oscillate.html, retrieved Apr. 18, 2019.

PCT/US2019/052965 International Search Report and Written Opinion dated Jan. 28, 2020.

Roth, "Simulation and Test Pattern Generation for Bridge Faults in CMOS ICs," University of Santa Cruz, Thesis by Carl Roth, (Jun. 1994).

Neiroukh, et al., "Transforming Cyclic Circuits Into Acyclic Equivalents," IEEE Transactions on Computer-Aided Design of Integrated Circuits and Systems, vol. 27, No. 10, pp. 1775-1787, (Oct. 2008).

\* cited by examiner

HARDWARE SIMULATION SYSTEMS AND METHODS FOR IDENTIFYING STATE-HOLDING LOOPS AND OSCILLATING LOOPS

CROSS REFERENCE TO RELATED APPLICATIONS

The present application claims benefit under 35 USC 119(e) of U.S. Application Ser. No. 62/735,930, filed Sep. 25, 2018, the content of which is incorporated herein by reference in its entirety.

FIELD OF THE INVENTION

The present invention relates to integrated circuit emulation, and more specifically to detecting characteristics of loops within integrated circuit design via emulations.

COPYRIGHT NOTICE

The assignee of this patent document has no objection to the facsimile reproduction by anyone of the patent document itself or of the patent application, as it appears in the files of the United States Patent and Trademark Office, but otherwise reserves all rights whatsoever in any included works of authorship protected by copyright.

SPECIFICATION—DISCLAIMER

In the following Background, Summary, and Detailed Description, headings should not be construed as necessarily limiting. In the following Background, Summary and Detailed Description, the citation or identification of any publication does not signify relevance or status as prior art for any of the claimed or described embodiments. Paragraphs for which the text is all italicized signifies text that is common to multiple Synopsys patent specifications.

BACKGROUND

A step of chip (e.g., integrated circuit chip) design is verifying the correctness of a netlist. Simulation of the netlist is the preferred technique for design verification, as it is computationally feasible to increase correctness coverage with more input vectors.

Certain netlists include loops, which have been known to create difficulties for simulating those netlists with software or emulators, as the value of a signal can depend on itself. When a signal depends on itself, the circuit may be characterized by faulty behaviors, such as an oscillating signal output (creating an undefined behavior because the signal never stabilizes) and/or a state-holding signal (creating an unwanted dependency with regard to time).

Static analysis of loops has been known to be too computationally expensive to assess whether a loop is oscillating or state-holding during a software-implemented emulation. Therefore, faulty loops can go unnoticed during chip design and may make a netlist non-operational or manually difficult to debug.

SUMMARY

The claims signify a brief description of one or more of the innovations, embodiments, and/or examples found within this disclosure.

Certain embodiments are directed to software emulation configurations to identify state holding loops and/or oscillating loops by implementing a netlist with hardware simulations. Certain embodiments instrument loops with additional hardware logic that does not impact the performance of the original netlist, and is only responsible for detecting at simulation time the faulty behavior of loops (e.g., oscillating or state-holding). Whenever problematic loop structures are identified, a notification is generated to notify the user about the issue, to enable appropriate debugging processes for the design.

Various embodiments are directed to a hardware emulation system for circuit loop detection via circuit emulation, the system comprising at least one processor and at least one memory storing instructions that, with the at least one processor, cause the system to: identify one or more loops within an emulated circuit; generate an acyclic emulation of at least a portion of the emulated circuit, wherein the acyclic emulation is characterized by one or more loop breakers; generate a loop detector emulation of a hardware-based loop detector circuit based at least in part on a quantity of loop breakers n characterizing the acyclic emulation, wherein the loop detector emulation comprises at least one of an oscillation detector or a state-holding detector; and execute the loop detector emulation for a plurality of input values for the emulated circuit to generate an output indicating at least one of an oscillation status or a state-holding status of the emulated circuit.

In certain embodiments, identifying one or more loops within an emulated circuit comprises identifying one or more strongly connected components of the emulated circuit; and generating an acyclic emulation of at least a portion of the emulated circuit comprises generating an acyclic emulation of at least one of the one or more strongly connected components.

In various embodiments, each of the one or more strongly connected components of the emulated circuit comprise a plurality of vertices and a plurality of edges connecting the plurality of vertices; and generating an acyclic emulation of at least one of the one or more strongly connected components comprises replacing one or more edges with one or more loop breakers to generate the acyclic emulation of the at least one of the one or more strongly connected components.

The loop detector comprises of $2^n$ copies of the original SCC, whose loop breakers have been replaced with constants, therefore producing an acyclic circuit.

In various embodiments, the loop detector emulation comprises an oscillation detector embodied in accordance with:

$$OSC(Y) = \sim \sum_{S \in B^n} \left( \prod_{k=1}^{n} \delta(S[k], g_k^S(Y)) \right).$$

In certain embodiments, the loop detector emulation comprises a state-holding detector embodied in accordance with:

$$STH(Y) = \sum_{\substack{S_0, S_1 \in B^n \\ S_0 < S_1}} \left( \prod_{k=1}^{n} \delta(S_0[k], g_k^{S_0}(Y)) * \prod_{k=1}^{n} \delta(S_1[k], g_k^{S_1}(Y)) \right).$$

Various embodiments are directed to a method for circuit loop detection via circuit emulation, the method comprising: identifying one or more loops within an emulated circuit; generating an acyclic emulation of at least a portion of the emulated circuit, wherein the acyclic emulation is characterized by one or more loop breakers; generating a loop detector emulation of a hardware-based loop detector circuit based at least in part on a quantity of loop breakers n characterizing the acyclic emulation, wherein the loop detector emulation comprises at least one of an oscillation detector or a state-holding detector; and executing the loop detector emulation for a plurality of input values for the emulated circuit to generate an output indicating at least one of an oscillation status or a state-holding status of the emulated circuit.

In certain embodiments, identifying one or more loops within an emulated circuit comprises identifying one or more strongly connected components of the emulated circuit; and generating an acyclic emulation of at least a portion of the emulated circuit comprises generating an acyclic emulation of at least one of the one or more strongly connected components.

In certain embodiments, each of the one or more strongly connected components of the emulated circuit comprise a plurality of vertices and a plurality of edges connecting the plurality of vertices; and generating an acyclic emulation of at least one of the one or more strongly connected components comprises replacing one or more edges with one or more loop breakers to generate the acyclic emulation of the at least one of the one or more strongly connected components.

In various embodiments, the loop detector emulation comprises $2^n$ copies of the original SCC, whose loop breakers have been replaced with constants, therefore producing an acyclic circuit In various embodiments, the loop detector emulation comprises an oscillation detector embodied in accordance with:

$$OSC(Y) = \sim \sum_{S \in B^n} \left( \prod_{k=1}^{n} \delta(S[k], g_k^S(Y)) \right).$$

In certain embodiments, the loop detector emulation comprises a state-holding detector embodied in accordance with:

$$STH(Y) = \sum_{\substack{S_0, S_1 \in B^n \\ S_0 < S_1}} \left( \prod_{k=1}^{n} \delta(S_0[k], g_k^{S_0}(Y)) * \prod_{k=1}^{n} \delta(S_1[k], g_k^{S_1}(Y)) \right).$$

Certain embodiments are directed to a more efficient/useful electronic structure for circuit design, testing and/or manufacturing, comprising a plurality of modules configured to perform the functions as discussed herein. Other embodiments are directed to a more efficient/useful electronic circuit comprising: a plurality of modules configured to perform the functions discussed herein. Moreover, certain embodiments are directed to a more efficient/useful method for circuit design, testing and/or manufacturing, comprising: a plurality of modules configured to perform the functions discussed herein.

Various embodiments are directed to a non-transitory computer-readable storage medium comprising executable instructions configured to, when executed by a processor, cause the processor to: identify one or more loops within an emulated circuit; generate an acyclic emulation of at least a portion of the emulated circuit, wherein the acyclic emulation is characterized by one or more loop breakers; generate a loop detector emulation of a hardware-based loop detector circuit based at least in part on a quantity of loop breakers n characterizing the acyclic emulation, wherein the loop detector emulation comprises at least one of an oscillation detector or a state-holding detector; and execute the loop detector emulation for a plurality of input values for the emulated circuit to generate an output indicating at least one of an oscillation status or a state-holding status of the emulated circuit.

In accordance with certain embodiments, identifying one or more loops within an emulated circuit comprises identifying one or more strongly connected components of the emulated circuit; and generating an acyclic emulation of at least a portion of the emulated circuit comprises generating an acyclic emulation of at least one of the one or more strongly connected components.

In various embodiments, each of the one or more strongly connected components of the emulated circuit comprise a plurality of vertices and a plurality of edges connecting the plurality of vertices; and generating an acyclic emulation of at least one of the one or more strongly connected components comprises replacing one or more edges with one or more loop breakers to generate the acyclic emulation of the at least one of the one or more strongly connected components.

The loop detector comprises of $2^n$ copies of the original SCC, whose loop breakers have been replaced with constants, therefore producing an acyclic circuit.

In various embodiments, the loop detector emulation comprises an oscillation detector embodied in accordance with:

$$OSC(Y) = \sim \sum_{S \in B^n} \left( \prod_{k=1}^{n} \delta(S[k], g_k^S(Y)) \right).$$

In certain embodiments, the loop detector emulation comprises a state-holding detector embodied in accordance with:

$$STH(Y) = \sum_{\substack{S_0, S_1 \in B^n \\ S_0 < S_1}} \left( \prod_{k=1}^{n} \delta(S_0[k], g_k^{S_0}(Y)) * \prod_{k=1}^{n} \delta(S_1[k], g_k^{S_1}(Y)) \right).$$

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

DRAWINGS

The following Detailed Description, Figures, appended Additional Figures and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

FIG. 1 shows an example netlist illustrating various loops therein.

FIG. 2 schematically illustrates a strongly-connected component as discussed herein.

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

Definitions

The following discussion of terminology is provided for additional context in the subsequent description of various embodiments. The discussion of these terms is provided with reference to the illustration of FIG. 1, which illustrates a graph having a set of vertices V={A, B, C, D, E, F, G, H, I}.

Figure 1:
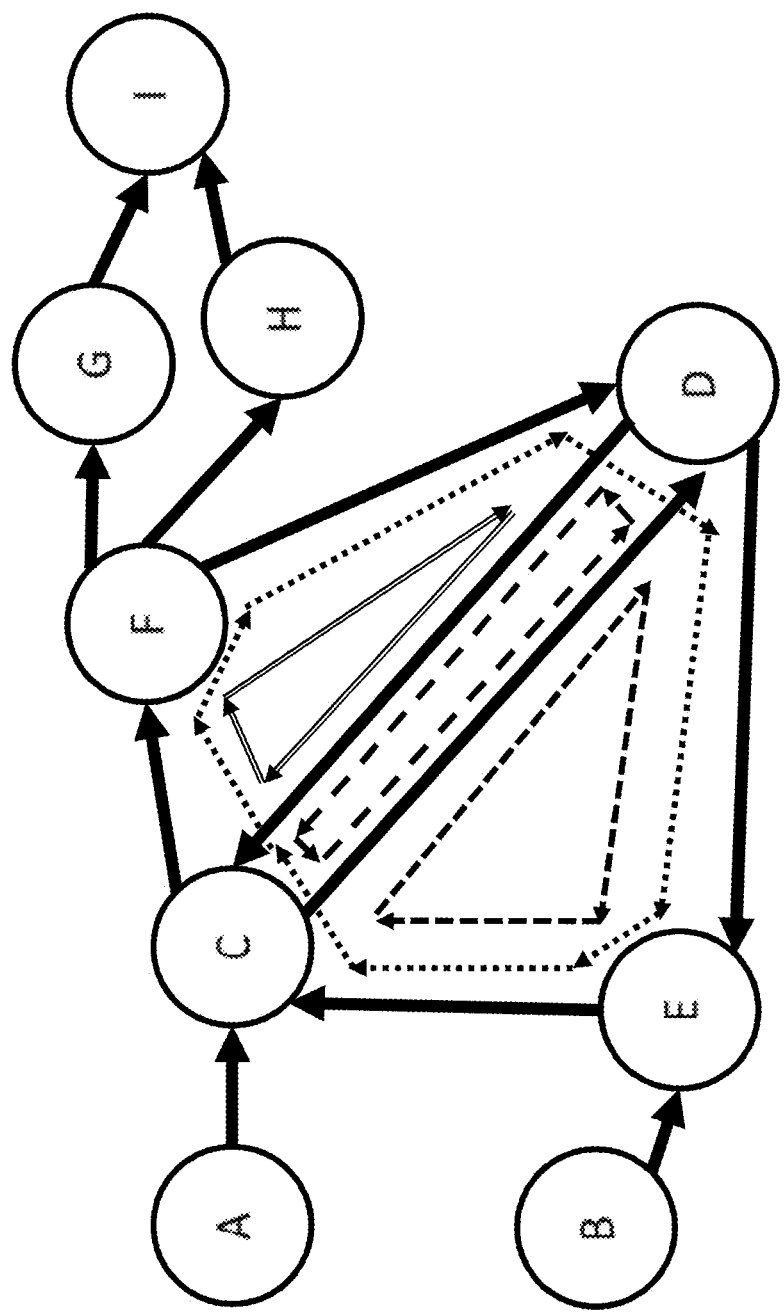
Figure 2:
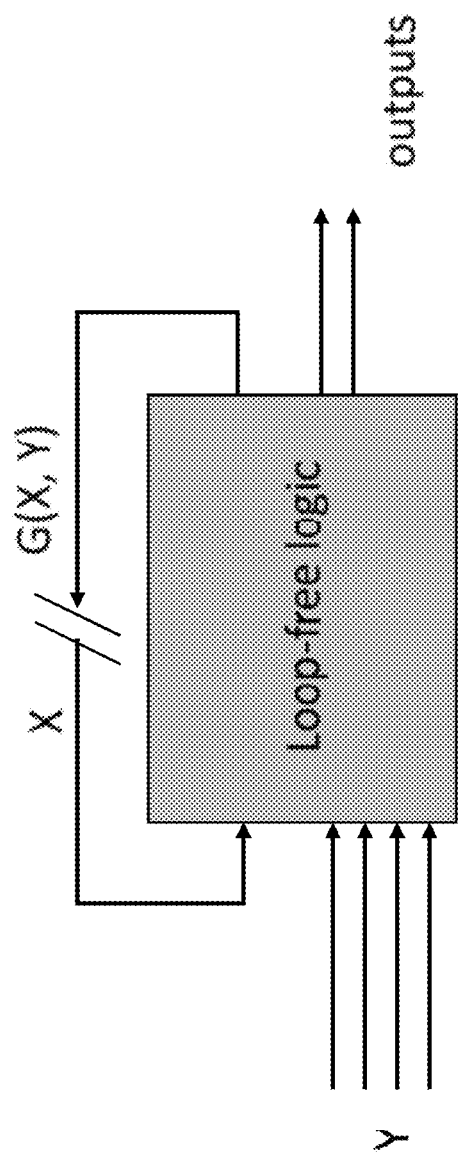

As shown in FIG. 1, the set of directed edges are illustrated by the thick arrows connecting vertices. If an edge from a Source vertex to a Target vertex is denoted as ST (source-to-target), then the set of edges within the graph illustrated in FIG. 1 is E={AC, BE, EC, CF, CD, DC, DE, FD, FG, FH, GI, HI}.

Thus, the graph G={V, E} of FIG. 1 is a directed graph, which is a couple (V, E) of vertices V and edges E. The set of edges E is a subset of V×V. We say that a vertex v2 is a successor of vertex v1 if and only if (v1, v2) is an edge. We say that v2 is reachable from v1 if and only if there is a sequence of edges $(v\_i, v\_{i+1})$, $0<=i<=n$, such that $v\_0=v1$ and $v\_{n+1}=v2$.

A subgraph of G is a graph G'=(V', E'), such that V' is included in V, and E' is included in (V'×V') and E. In the illustrated embodiment of FIG. 1, a subgraph S of G encompasses a portion of the illustrated vertices and edges. Thus, S={{F, G, I, H}, {FG, FH, GI, HI}} is a subgraph of G.

The inputs of a subgraph G'=(V', E') (denoted as Y in certain embodiments) are all the ingoing edges of V' that are not in E'. Thus, the subgraph S discussed above (i.e., S={{F, G, I, H}, {FG, FH, GI, HI}}) has a single input, Y=CF.

A loop in a directed graph is a sequence of edges $(v\_i, v\_{i+1})$, $0<=i<=n$, such that $v0=v\_{n+1}$. A graph is acyclic if and only if is does not contain any loop. In the illustrated embodiment of FIG. 1, the graph G encompasses 4 loops:

Loop 1 encompasses {C, F, D, C} (illustrated with parallel lines).

Loop 2 encompasses {C, D, E, C} (illustrated with close dashed lines).

Loop 3 encompasses {C, D, C} (illustrated with spaced dash lines).

Loop 4 encompasses {C, F, D, E, C} (illustrated with dotted lines).

A strongly connected component C in a directed graph G is a subgraph of G, such that any vertex of C is reachable from any other vertex of C. As discussed herein, "strongly connected component" is denoted as "SCC." In the illustrated embodiment of FIG. 1, the graph G includes only 1 SCC, S={C, F, D, E}. As shown therein, every node within S can be reached from any other node in S. Also, the SCC contains all possible loops discussed above Note that any loop in a graph is necessarily included within a SCC.

Given a strongly connected component C=(V', E'), we can define a loopbreaker as an edge included within E', such that removing that edge disconnects a loop within C. Finding a minimal number of loopbreakers may comprise determining the minimum number of loopbreakers necessary to render the strongly connected component acyclic, such that the strongly connected component no longer includes a loop. Within the strongly connected component, we can define a set BK, included in E', such that disconnecting each edges between vertices of BK (e.g., replacing each edge between vertices with a corresponding loopbreaker) results in C becoming an acyclic graph. The set BK is referred to herein as a set of breakpoints. A trivial set is BK=E'. Finding a set of breakpoints may be achieved, for example, with a simple $O(|C|)$ greedy algorithm.

In the illustrated embodiment of FIG. 1 removal of the edge DC breaks Loop 1 and Loop 3. Removal of the edge EC breaks Loop 2 and Loop 4. Removal of both edges DC and EC makes graph G acyclic, as there are no longer any loops within G. Thus, graph G requires a set of loop breakers, BK encompassing two loop breakers.

We can reduce a netlist to an equivalent netlist made of single-output gates. Then a netlist can be modeled as a directed graph (V, E), whose vertices are gates, and such that there is an edge (v1, v2) if and only if there is a wire of the netlist connecting the output port of gate v1 to an input port of gate v2.

Let us define B={0,1} as the set of Boolean values. A Boolean function with n variables is a function from $B^n$ into B. We will note Y and X vectors of Boolean variables, e.g., Y={y_1, . . . , y_m} and X={x_1, . . . , x_n}. Let f be a Boolean function. We denote ~f as its negation.

Let f be a Boolean function. We define the delta function δ as:

$$\delta: (x \in B, f) \xrightarrow{yields} \begin{cases} f & \text{if } f \ x = 1 \\ \sim f & \text{if } f \ x = 0 \end{cases}$$

Let g(Y,X) be a Boolean function from $B^m \times B^n$ to B, where Y belongs to $B^m$ and X belongs to $B^n$. For S in $B^n$, we note $g^S$ the Boolean function from $B^m$ to B defined as: $g^S(Y)=g(Y, S)$. We call $g^S$ the cofactor of g with regard to S. We denote S[k] (1<=k<=n) the k-th Boolean value of the n-tuple S belonging to $B^n$.

Decision Procedures

Various embodiments are directed to hardware emulation systems and methods configured for identifying one or more characteristics of subgraphs included within graphs characterizing a chip design. As discussed herein, various embodiments emulate additional hardware by emulating SCCs as acyclic subgraphs within an emulated hardware system, wherein constants are substituted in place of breakpoints of the acyclic subgraph emulations of SCCs. Thus, various embodiments are configured for execution with and/or in association with a chip design process (e.g., an integrated circuit design process), for example, after an initial chip design (e.g., a netlist) has been generated (e.g., after generation of Verilog code associated with the chip design).

For a given netlist describing a chip design (e.g., generated at least in part with an EDA software tool), one or more loops included therein may be analyzed to determine whether the loops have one or more problematic characteristics. Thus, within a netlist describing a chip design, various embodiments are configured to identify one or more SCCs included within the netlist (e.g., identified as subgraphs of an overall graph embodying the chip design). As discussed herein, an SCC may comprise a subgraph in which all vertices of the subgraph are reachable from all other vertices. Thus, identifying one or more SCCs within a graph may be performed automatically, by determining which vertices are reachable from other vertices, and identifying groupings of vertices in which all vertices within the grouping (the subgraph) are reachable from all other vertices.

For each SCC, let C be the SCC. Embodiments discussed herein compute the inputs of C, the inputs being designated as Y. Moreover, embodiments calculate a set of breakpoints X (e.g., via greedy algorithms) identified as edges within a subgraph that, if removed, would render the SCC as an acyclic subgraph. These breakpoints may be replaced with loop breakers—removed edges disconnecting the vertices that were previously connected with the edge. In certain embodiments, the hardware emulation system may be configured to identify the fewest possible breakpoints X that render the entire graph acyclic such that the fewest number of loop breakers are required for a determination of whether the graph comprises any SCCs having oscillating loops or state-holding loops. Let X={x_1, . . . , X_n}. Given a breakpoint x_k (1<=k<=n), we denote g_k(Y, X) the Boolean function defined at the output of the gate corresponding to the edge x_k.

Figure 9:
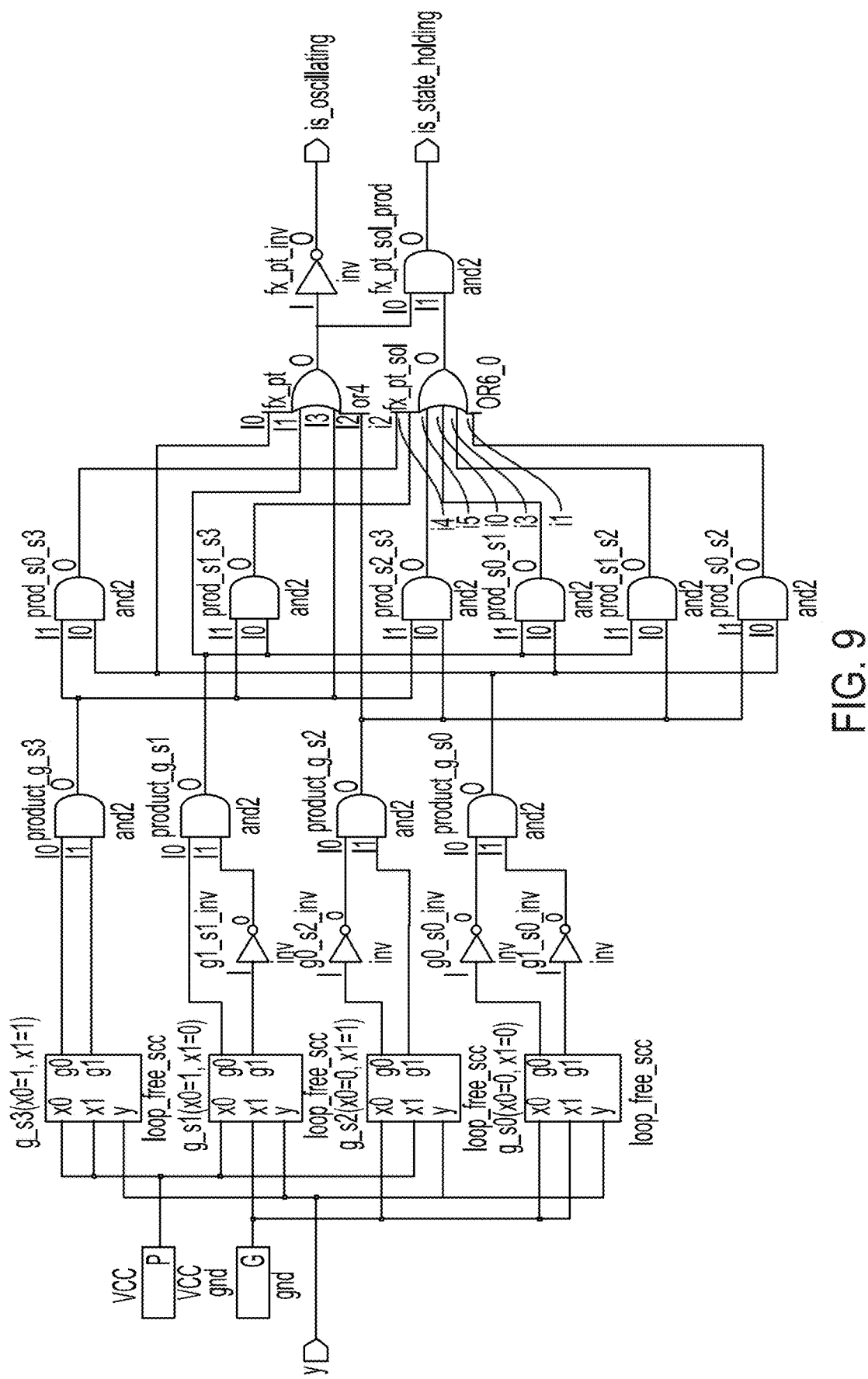
FIG. 9 illustrates the schematics of a loop-analyzing circuit encompassing two loop-breakers according to various embodiments.

FIG. 9 illustrates an example SCC (represented with its loop breakers)—the illustrated embodiment of FIG. 9 incorporated 2 loop breakers for the example SCC), where G(Y,X)=[g_1(Y,X), g_2(Y,X)].

The function g_k(Y, X) is well defined (i.e., non-oscillating) if and only if its fixpoint equation has a solution for all k within k=[1, n]. In other words, for all Y values, there must exist an X={x_1, . . . , X_n} value satisfying x_k=g_k(Y, X).

The function g_k(Y, X) is well defined and not state-holding if and only if its fixpoint equation has a unique solution.

Hardware Instrumentation Procedure

Given a netlist, the decision procedures discussed above may be implemented by an emulation system by emulating additional hardware. This additional hardware is embodied as emulating SCCs as acyclic subgraphs (including loop breakers as discussed herein) together with substituting constants in place of their breakpoints. Accordingly, systems (e.g., an EDA software tool) may be configured to automatically generate appropriate hardware emulations based at least in part on the identified SCCs (and acyclic variations of the SCCs) to enable a determination of one or more characteristics of the SCCs. Moreover, the additional hardware may additionally comprise one or more loop determination circuits as discussed below. For example, the loop determination circuits may comprise one or more copies (e.g., $2^n$ copies, where n is equal to the quantity of loop breakers (or breakpoints) within the SCC). In certain embodiments, the copies may be embodied as simplified representations of the original acyclic subgraph representation of an SCC (e.g., having identical functionality of the original acyclic subgraph representation of the SCC).

1. First, a plurality (e.g., all) SCCs of a provided netlist graph are identified as discussed above. Because any loop is contained in a unique SCC, each SCC may be independently processed and while ensuring that all loops of the design are considered by the loop determinations as discussed herein.
2. Let C be a SCC. We compute its set of inputs Y, and a set of breakpoints X. Let $X=\{x_1, \ldots, x_n\}$. For $x_k$ ($1<=k<=n$), let $g_k(Y, X)$ the Boolean function implemented at loopbreaker $x_k$.
3. In certain embodiments, the system generates a loop detector comprising an emulated hardware circuit for the following function OSC(Y), which is configured to determine whether the SCC comprises an oscillating loop. We call that function an oscillation detector. Whenever OSC(Y)=1, the SCC does not admit a fixpoint solution for that Y, which means it contains an oscillating loop.

$$OSC(Y) = \sim \sum_{S \in B^n} \left( \prod_{k=1}^{n} \delta(S[k], g_k^S(Y)) \right)$$

4. In certain embodiments, the system generates a loop detector comprising an emulated hardware circuit for the following function STH(Y), which is configured to determine whether the SCC comprises a state-holding loop. It should be understood that the loop detector may comprise both the oscillation detector and the state-holding detector. In other embodiments, the loop detector may comprise one of the oscillation detector or the state-holding detector. Whenever OSC(Y)=0 and STH(Y)=1, the SCC does admit a fixpoint solution, which however is not unique. This means that it contains a state-holding loop. We call that function the state-holding detector.

$$STH(Y) = \sum_{\substack{S_0, S_1 \in B^n \\ S_0 < S_1}} \left( \prod_{k=1}^{n} \delta(S_0[k], g_k^{S_0}(Y)) * \prod_{k=1}^{n} \delta(S_1[k], g_k^{S_1}(Y)) \right)$$

TABLE 1

Case analysis depending on the values of the detectors for an input Y of the SCC.

|  | OSC(Y) = 0 | OSC(Y) = 1 |
|---|---|---|
| STH(Y) = 0 | SCC has a unique fixpoint. Note however that it could exist a delay distribution in the SCC that makes it non-deterministic. | SCC oscillates. This means a non-deterministic value at emulation. |
| STH(Y) = 1 | SCC has at least one state-holding configuration that makes its behavior deterministic. However, it could exist a delay-distribution in the SCC and a state-holding configuration for which the SCC is non-deterministic. | |

In certain embodiments, the oscillation detector and the state-holding detector produce a value that may operate to initiate (e.g., automatically) a debug process. As other examples, the produced value may be utilized by any of a variety of processes. Note that those detectors are evaluated at the same time as the design being simulated, without slowing down the simulation itself. This is because the detectors are made of copies of SCCs with inside breakpoints forced to constant values, therefore they cannot be slower than the design itself.

For example, a hardware emulation of the loop detector comprising at least one of the oscillation detector or the state-holding detector may be further configured to generate an alert (e.g., a popup alert to be provided to a user of the emulation module, a notification transmitted to a user associated with an emulation of the graph (e.g., embodying an emulation of a chip design), and/or the like). In such embodiments, the user may choose to initiate a debug process based on the received notification).

EXAMPLE 1

Design with an Oscillating SCC

Figure 3:
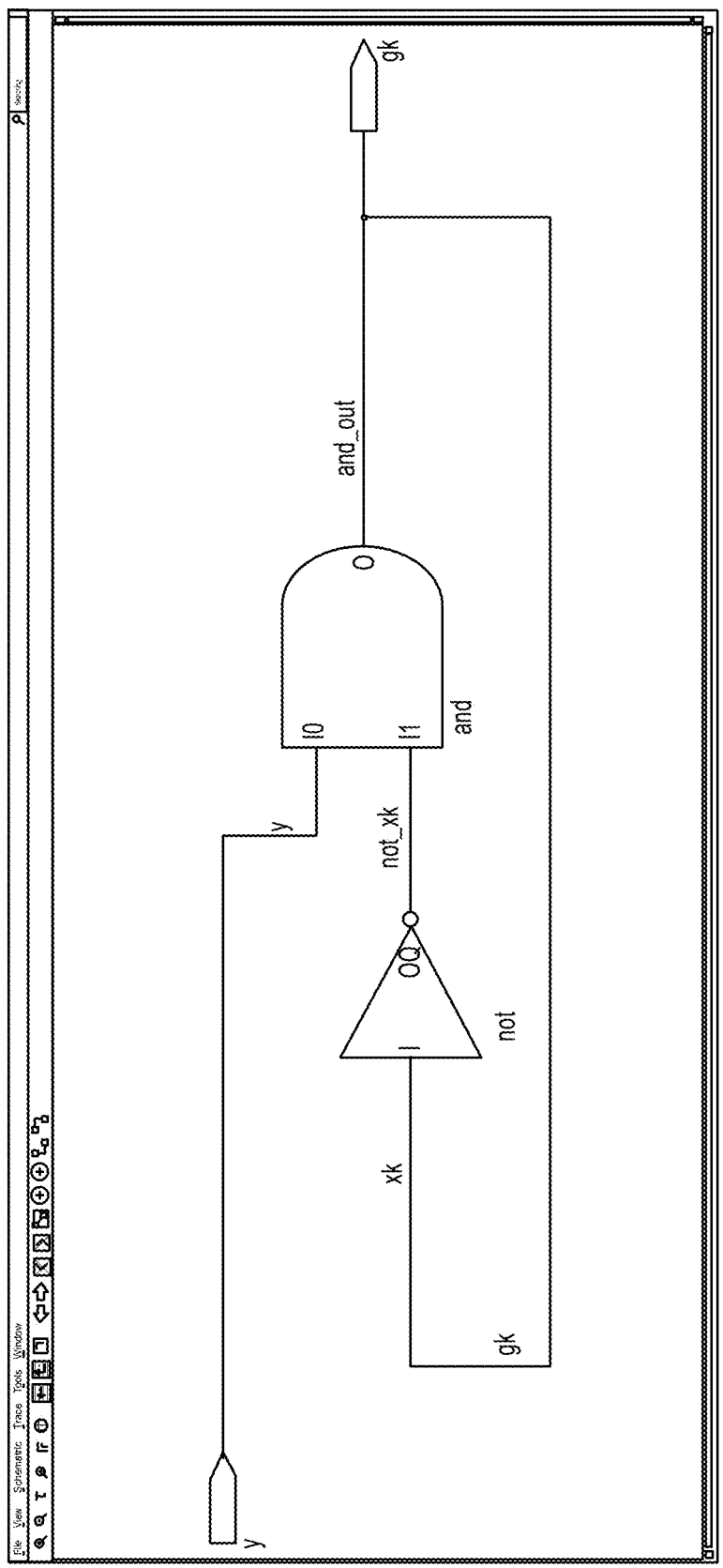
FIG. 3 illustrates the schematics of an example Verilog-defined circuit.

FIG. 3 illustrates the schematics of a circuit described by the following Verilog:

module scc_1(input y, output gk);

wire xk;

not inv(not_xk, xk);

and and2(and_out, y, not_xk);

assign gk=and_out;

assign xk=gk;

endmodule

For the circuit denoted above, there is only one loop breaker $x_1$, thus n=1. Executing the above models for determining whether an SCC is oscillating yields:

$$OSC(y) = \sim(\sim g_{1(x1=0)} + g_{1(x1=1)})$$
$$= \sim(\sim(y \cdot \sim 0) + (y \cdot \sim 1))$$
$$= \sim(\sim y + 0)$$
$$= y$$

The resulting solution demonstrates that oscillation is present in the circuit when y=1 (i.e., OSC(y)=1) and a fixed point in the solution when y=0 (OSC(y)=0). For verification, when y=0, the output gk is stable at 0. When y=1, the schematics simplify to a self-looped inverter, and the value of gk oscillates between 0 and 1 without ever stabilizing.

Figure 4:
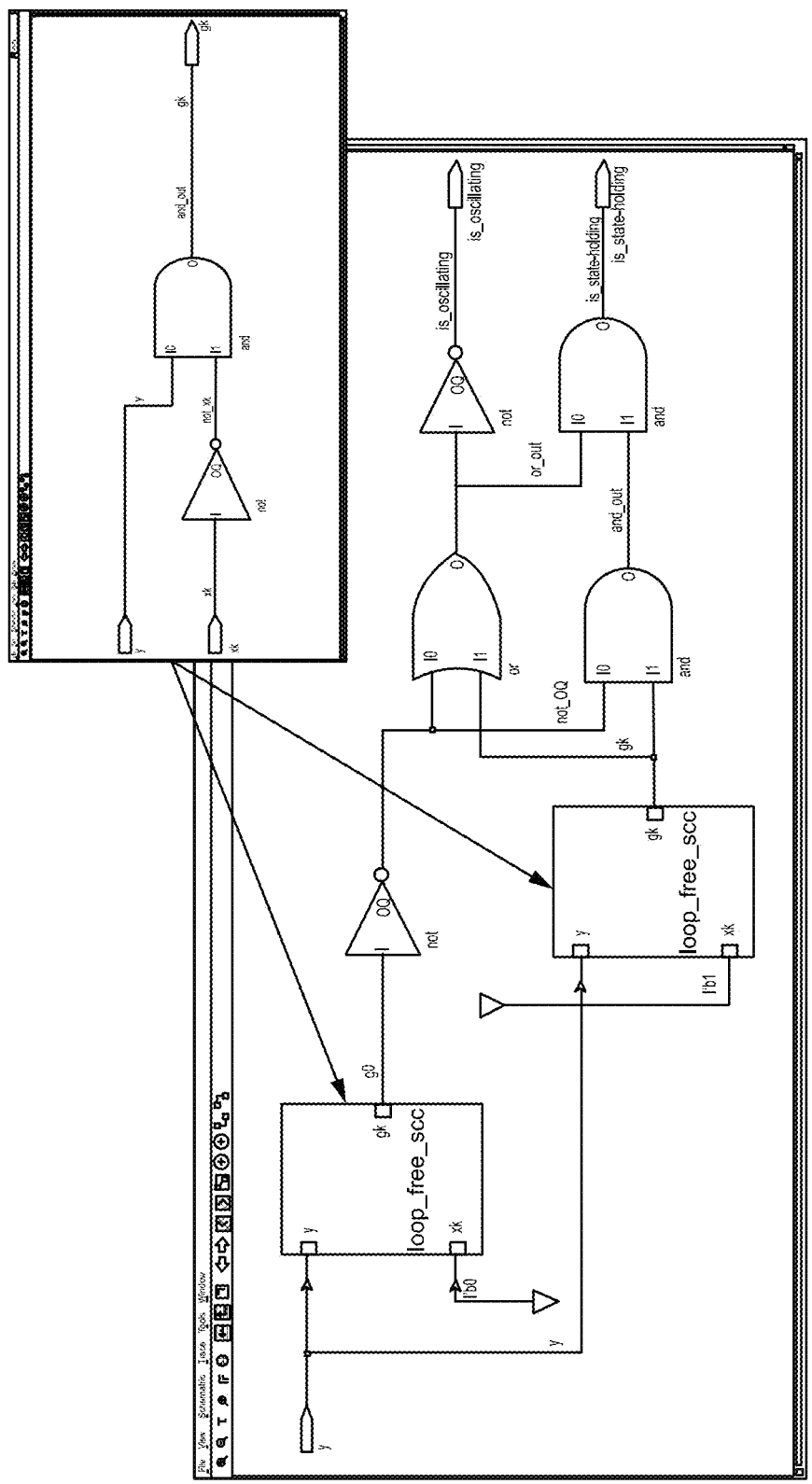
FIG. 4 illustrates the implementation of a loop-analyzing circuit for the circuit illustrated in FIG. 3.

FIG. 4 illustrates schematics of a hardware implementation that evaluates OSC(y) and STH(y). For verification, propagating the constants that "is oscillating" becomes assigned to "y", which is identical to the results of the equation OSC(y) provided above. Upon determining that, for at least one input, the SCC oscillates, the emulation module may be configured to generate an alert to be provided to a user.

EXAMPLE 2

Design with Non-Oscillating, State-Holding SCC

Figure 5:
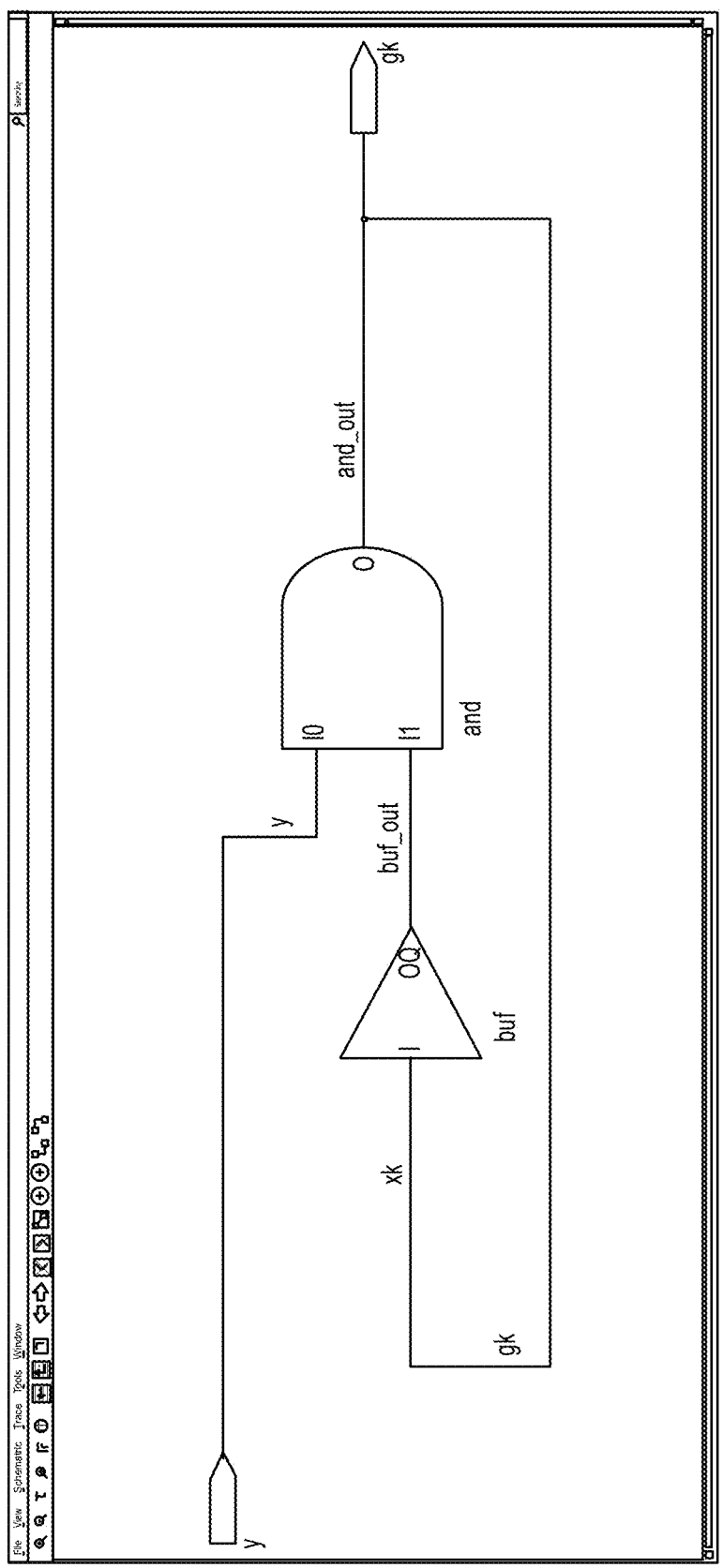
FIG. 5 illustrates the schematics of another example Verilog-defined circuit.

FIG. 5 illustrates the schematics of a circuit describe by the following Verilog:
  module scc_2(input y, output gk);
  wire xk;
  buf buffer(buf_out, xk);
  and and2(and_out, y, buf_out);
  assign gk=and_out;
  assign xk=gk;
  endmodule Executing the above models for determining whether the SCC is oscillating yields:

$$OSC(y) = \sim(\sim g_{1(x1=0)} + g_{1(x1=1)})$$
$$= \sim(\sim(y \cdot 0) + (y \cdot 1))$$
$$= \sim(\sim 0 + y)$$
$$= 0$$

Thus, OSC(y)=0, regardless of the input, and therefore oscillation cannot occur in the illustrated circuit.

Executing the above model for determining whether the SCC is state-holding yields:

$$\sum_{\substack{S_0, S_1 \in B^n \\ S_0 < S_1}} \left( \prod_{k=1}^{n} \delta_0(S[k], g_k^{S_0}(Y)) * \prod_{k=1}^{n} \delta(S_1[k], g_k^{S_1}(Y)) \right)$$
$$= \sim g_1^0 * g_1^1$$
$$= (\sim(y*0))*(y*1)$$
$$= y$$

Thus, the circuit is state holding when y=1—under such a condition, xk may be assigned to either 0 or 1, and both values are valid hardware states.

Figure 6:
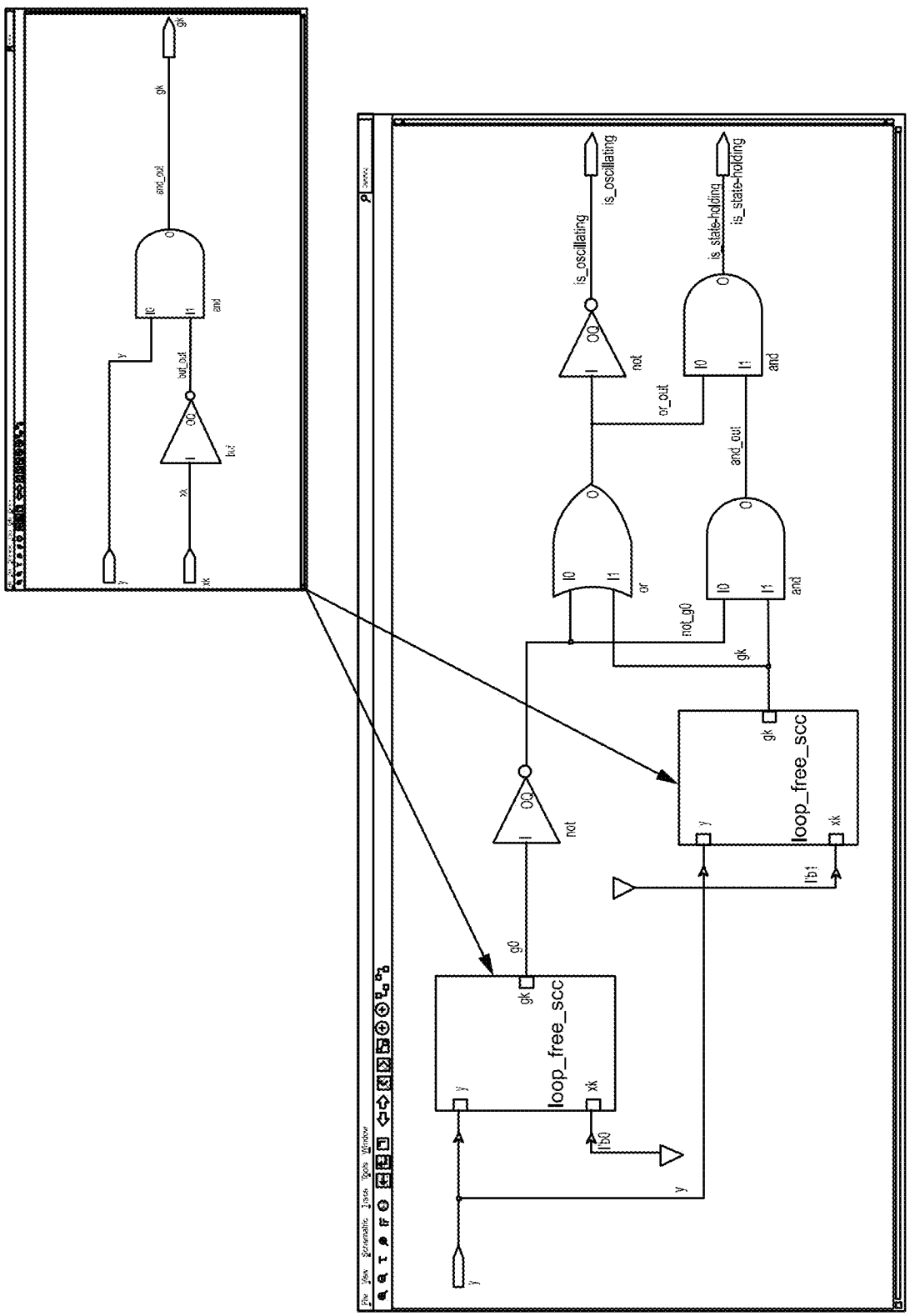
FIG. 6 illustrates the implementation of a loop-analyzing circuit for the circuit illustrated in FIG. 5.

FIG. 6 illustrates schematics of a hardware implementation that evaluates OSC(y) and STH(y). For verification, propagating the constants that "is_oscillating" becomes 0 and "is_state_holding" is assigned to "y", which is identical to the results of the equations OSC(y) and STH(y) discussed above.

EXAMPLE 3

Design with a Stable, Non-State Holding SCC

Figure 7:
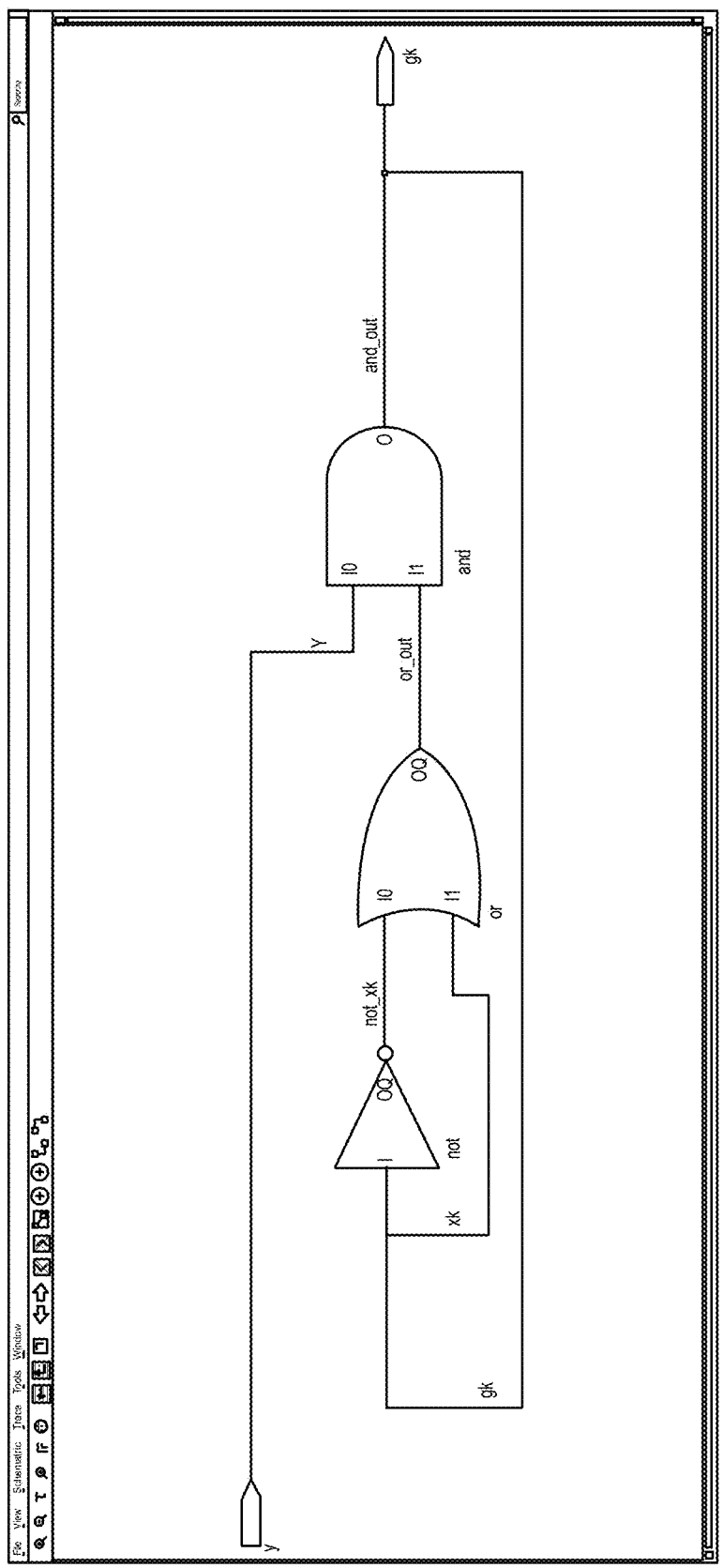
FIG. 7 illustrates the schematics of an example Verilog-defined circuit.

FIG. 7 illustrates the schematics of a circuit described by the following Verilog:
  module scc_2 (input y, output gk);
  wire xk;
  or or2(~xk, xk);
  and and2(and_out, y, buf_out);
  assign gk=and_out;
  assign xk=gk;
  endmodule Executing the above models for determining whether the SCC is oscillating yields:

$$OSC(y) = \sim(\sim g_{1(x1=0)} + g_{1(x1=1)})$$
$$= \sim(\sim(y \cdot 1) + (y \cdot 1))$$
$$= \sim(\sim y + y)$$
$$= 0$$

Thus, OSC(y)=0, regardless of the input, indicating that oscillation cannot occur in the illustrated circuit.

Executing the above models for determining whether the SCC is state-holding yields:

$$\sum_{\substack{S_0, S_1 \in B^n \\ S_0 < S_1}} \left( \prod_{k=1}^{n} \delta_0(S[k], g_k^{S_0}(Y)) * \prod_{k=1}^{n} \delta(S_1[k], g_k^{S_1}(Y)) \right)$$
$$= \sim g_1^0 * g_1^1$$
$$= \sim y * y$$
$$= y$$

Thus, STH(y)=0, regardless of the input, indicating that the illustrated circuit is never state holding.

Figure 8:
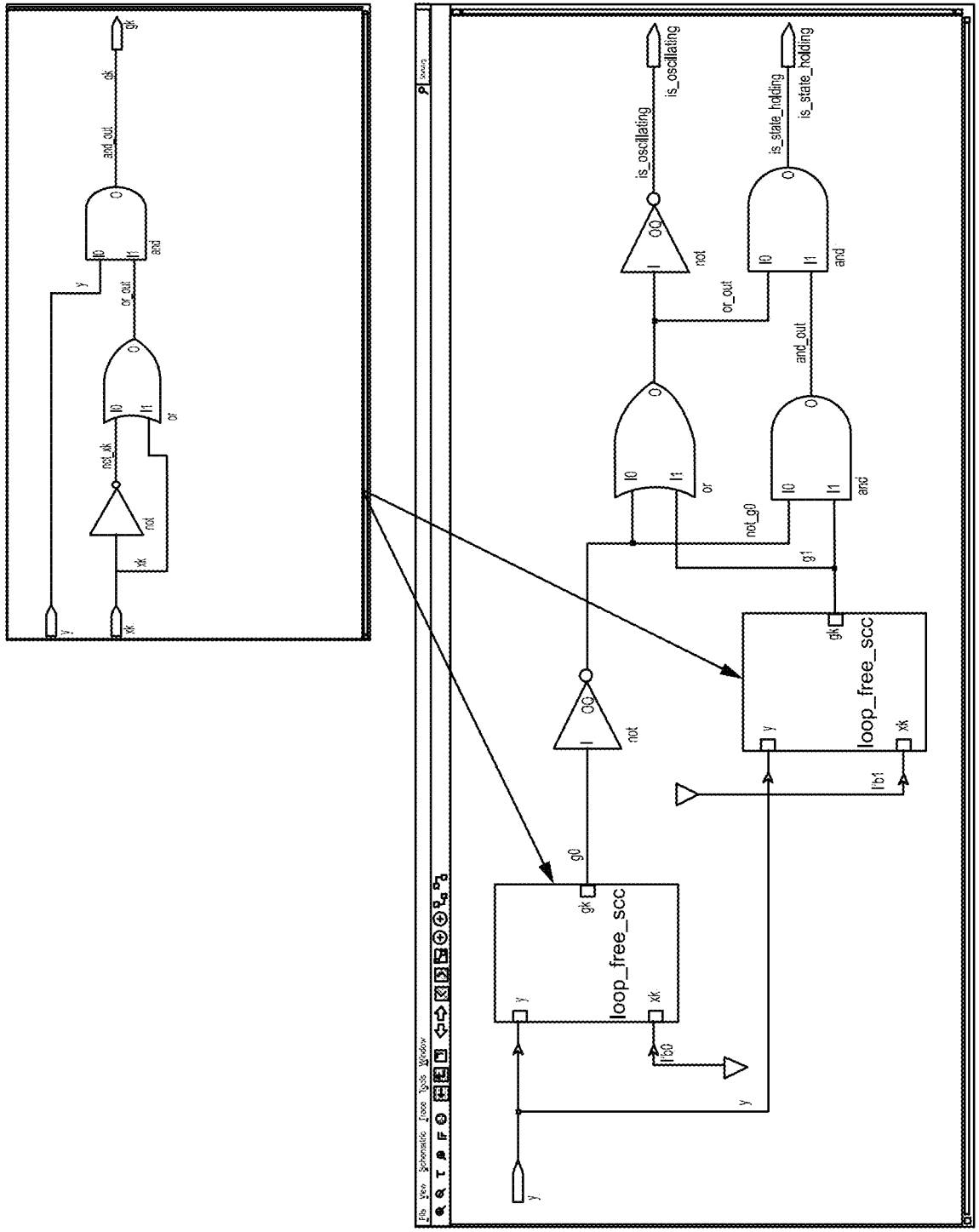
FIG. 8 illustrates the implementation of a loop-analyzing circuit for the circuit illustrated in FIG. 7.

FIG. 8 illustrates the schematics of a hardware implementation that evaluates OSC(y) and STH(y). For verification, propagating the constants that both signals "is_oscillating" and "is_state_holding" become 0, which matches the results of the equations OSC(y) and STH(y) discussed above. A correlate of the result is that since the circuit is non-oscillating and non-state holding, the circuit can be replaced with an equivalent loop-free (acyclic) circuit. Indeed, the circuit behaves as a single buffer from y to gk.

EXAMPLE 4

Oscillation Detection Incorporating 2 Loop Breakers

FIG. 9 illustrates schematics of a hardware implementation (embodied as an emulation) that evaluates OSC(y) and STH(y) for a circuit requiring 2 loop breakers to form an acyclic variation thereof. In the illustrated embodiment, the emulated hardware circuit comprises $2^2$ acyclic reproductions of SCCs embodied within an applicable circuit, in light of the 2 included loop breakers. For each loop breaker, the hardware implementation considers each possible input value for the SCC to determine whether an oscillation or state-holding condition is present. As a result, oscillation detection yields:

$$OSC(Y) = \sim((\sim g_{1(x1=0, \ x2=0)} \sim g_{2(x1=0, \ x2=0)}) + (g_{1(x1=1, \ x2=0)} \sim g_{2(x1=1, \ x2=0)}) + (\sim g_{1(x1=0, \ x2=1)} g_{2(x1=0, \ x2=1)}) + (g_{1(x1=1, \ x2=1)} g_{2(x1=1, \ x2=1)}))$$

As discussed above, upon determining that the output of the illustrated hardware emulation indicates that a given SCC analyzed via the loop determination circuit is an oscillating SCC or a state-holding SCC, the emulation module may be configured to generate a notification for a user of the emulation module indicating that a particular SCC embodies an oscillating SCC or a state-holding SCC.

It should be understood that the representation of a 2 loop breaker hardware implementation illustrated in FIG. 9 is provided for illustrating various functionality of certain embodiments, and that in certain embodiments, the exact number and/or types of gates may be reduced and/or otherwise modified to provide a simplified circuit design providing functionality. Similar logic may be utilized with other hardware emulations for any number of loop breakers.

DETAILED DESCRIPTION—TECHNOLOGY SUPPORT

General Computer Explanation

Figure 11A:
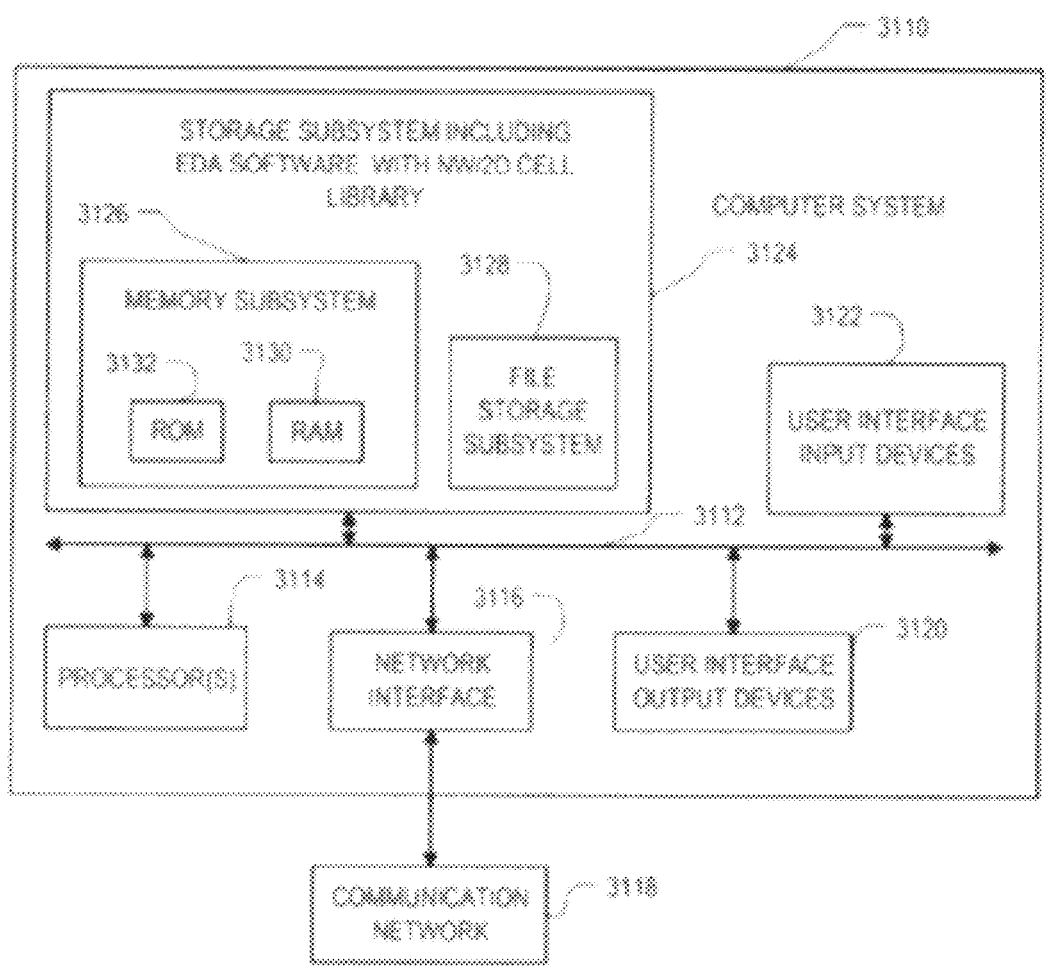
FIGS. 11A, 11B and 11C show simplified block diagrams of a computer system suitable for use with embodiments of the technology, as well as circuit design and circuit embodiments of the technology.
Figures 11B, 11C:
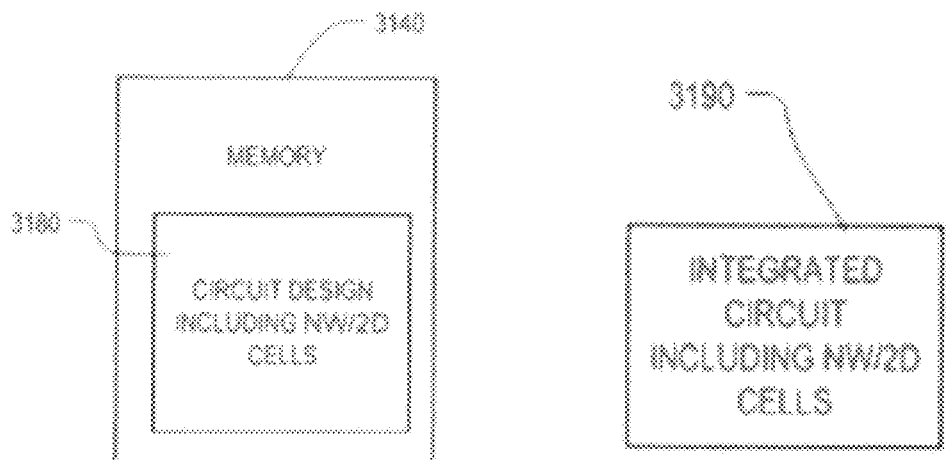

FIGS. 11A, 11B and 11C are simplified block diagrams of a computer system suitable for use with embodiments of the technology, as well as circuit design and circuit embodiments of the technology.

In FIG. 11A, computer system 3110 typically includes at least one computer or processor 3114 which communicates with a number of peripheral devices via bus subsystem 3112. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted "blade", a kiosk, a television, a game station, a network router, switch or bridge, or any data processing machine capable of executing instructions 124 (sequential or otherwise) that specify actions to be taken by that machine.

The computer system typically includes an operating system, such as Microsoft's Windows, Sun Microsystems's Solaris, Apple Computer's MacOS, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi processor or multi-core system and may use or be implemented in a distributed or remote system. The term 'processor' here is used in the broadest sense to include a singular processor and multi-core or multi processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3110 depicted in FIG. 31A is intended only as one example for purposes of illustrating the preferred embodiments. Many other configurations of computer system 3110 are possible having more or less components than the computer system depicted in FIG. 31A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 3122 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 3110 or onto communication network 3118. User interface input devices typically allow a user to select objects, icons, text and the like that appear on some types of user interface output devices, for example, a display subsystem.

User interface output devices 3120 may include a display subsystem, a printer, a fax machine, or non-visual displays such as audio output devices. The display subsystem may include a cathode ray tube (CRT), a flat panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 3110 to the user or to another machine or computer system.

Memory subsystem 3126 typically includes a number of memories including a main random-access memory (RAM) 3130 (or other volatile storage device) for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 3128.

Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses. For example, RAM-based main memory can communicate directly with file storage systems using Direct Memory Access (DMA) systems.

FIG. 11B depicts a memory 3140 such as a non-transitory, computer readable data and information storage medium associated with file storage subsystem 3128, and/or with network interface subsystem 3116, and can include a data structure specifying a circuit design. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 11C signifies an integrated circuit 3190 created with the described technology that includes one or more cells selected, for example, from a cell library.

DETAILED DESCRIPTION—TECHNOLOGY SUPPORT

Hardware/Software Equivalence

Some of the innovations, embodiments and/or examples described herein comprise and/or use a processor. As used herein, the term 'processor' signifies a tangible data and information processing device that physically transforms data and information, typically using a sequence transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi processor arrays, including graphic processing units, digital signal processors, digital processors or combinations of these elements.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. There is no scientific evidence that any of these processors are processing, storing and retrieving data and information, in any manner or form equivalent to the bioelectric structure of the human brain.

The one or more processors may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API)).

As used herein, the term 'module' signifies a tangible data and information processing device, that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Intel's Altera), Random Access Memories (RAMs) or microprocessors. A module is configured to process data and information, typically using a sequence transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a process comprising a sequence or set of operations or instructions that a module can use to transform data and information to achieve a result. A module can comprise one or more algorithms. As used herein, the term 'thread' refers to a sequence of instructions that can comprise a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software or has an interface device that receives the software over a network. This process is discussed in the General Computer Explanation section.

DETAILED DESCRIPTION—TECHNOLOGY SUPPORT

EDA System/Workflow Explanation

Figure 10:
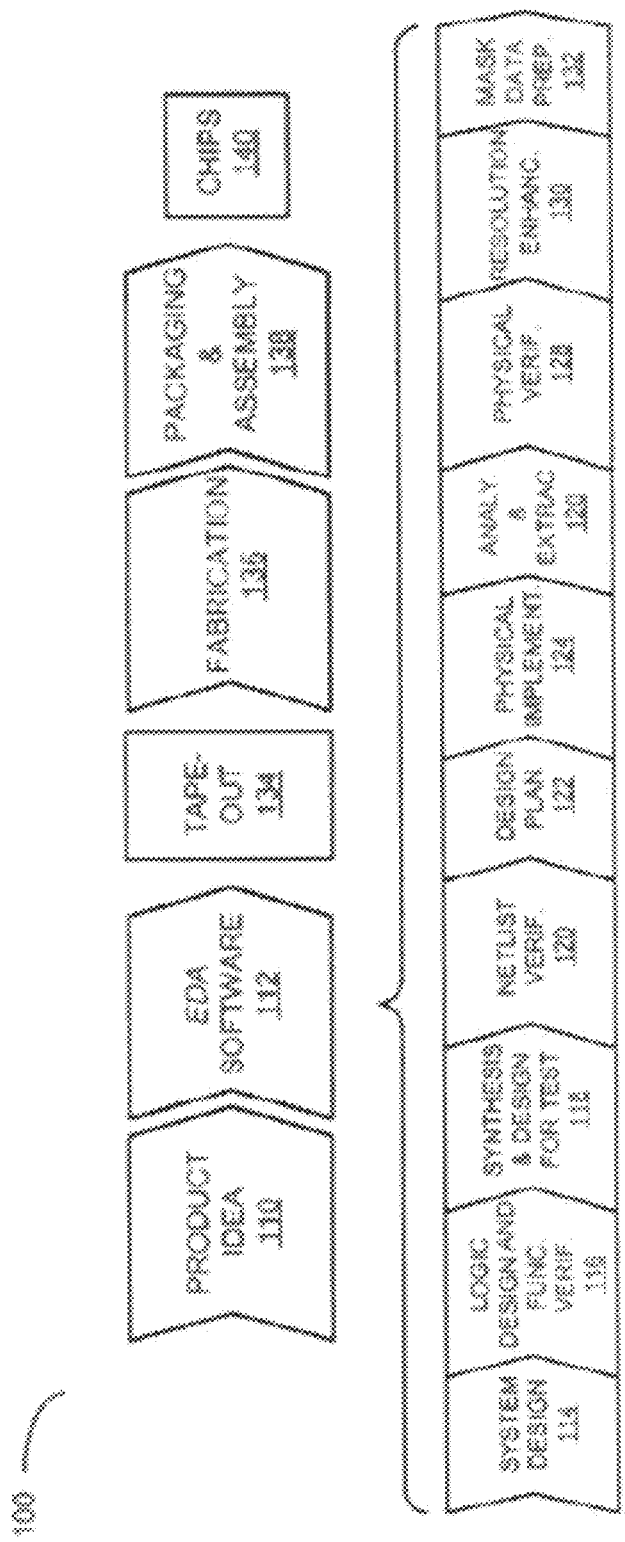
FIG. 10 is a flowchart of various operations in the design and fabrication of an integrated circuit in accordance with an embodiment of the present disclosure.

FIG. 10 illustrates various processes performed in the design, verification and fabrication of an item of manufacture such as an integrated circuit using software tools with a computer, and possibly special hardware-assisted tools, to transform and verify design data and instructions that represent the integrated circuit. These processes start with the generation of a product idea 110 with information supplied by a designer, information which is transformed during a process to create an item of manufacture (referred to herein as a design or device) that uses an EDA software tool 112, which may also be signified herein as EDA software, as a design tool, or a verification tool. When the design is finalized, it can be taped-out 134, which typically is when artwork (e.g., geometric patterns) for the integrated circuit is sent to a fabrication facility to manufacture the mask set, which is then used to manufacture the integrated circuit. After tape-out, a semiconductor die is fabricated 136 and packaging and assembly processes 138 are performed, which result in the finished integrated circuit 140 which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses an EDA software tool 112 includes processes 114-132, which are described below. This design flow description is for illustration purposes only and is not meant to limit the present disclosure. For example, an actual integrated circuit design may require a designer to perform the design operations in a different sequence than the sequence described herein.

During system design 114, a designer describes the functionality to be manufactured. The designer can also perform what-if planning to refine the functionality and to check costs, etc. Hardware-software architecture partitioning can occur at this stage. Exemplary EDA software products from Synopsys, Inc. of Mountain View, Calif., that can be used at this stage include: Model Architect, Saber, System Studio, and Designware products.

During logic design and functional verification 116, modules in the circuit are specified in one or more hardware description languages, or HDLs, and the design in HDL is checked for functional accuracy, that is, to match the requirements of the specification of the circuit or system being designed to ensure that the design produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu® and Protolink® (RTM="Registered Trademark").

During synthesis and design for test 118, HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include:

Design Compiler, Physical Compiler, Test Compiler, Power Compiler, FPGA Compiler, Tetramax, and Designware products.

During netlist verification 120, the netlist is checked for compliance with timing constraints and for correspondence with the HDL code. Exemplary EDA software products from Synopsys, Inc. of Mountain View, Calif. that can be used at this stage include: Formality, Primetime, and VCS products.

During design planning 122, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation 124, the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif. that can be used at this stage include: the Astro and IC Compiler products.

During analysis and extraction 126, the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification 128, the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement 130, geometric manipulations of the layout are performed to improve manufacturability of the design. Exemplary EDA software products from Synopsys, Inc. of Mountain View, Calif. that can be used at this stage include: Proteus products.

During tape-out, data is created to be used (after lithographic enhancements are applied if appropriate) for production of lithography masks. Example EDA software products from Synopsys, Inc., that can be used during tape-out include the IC Compiler and Custom Designer families of products.

During mask-data preparation 132, the 'tape-out' data is used to produce lithography masks that are used to produce finished integrated circuits. Exemplary EDA software products from Synopsys, Inc. of Mountain View, Calif. that can be used at this stage include the CATS family of products.

For all of the above mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software 112.

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

DETAILED DESCRIPTION—TECHNOLOGY SUPPORT

Emulation Environment Explanation

Figure 12:
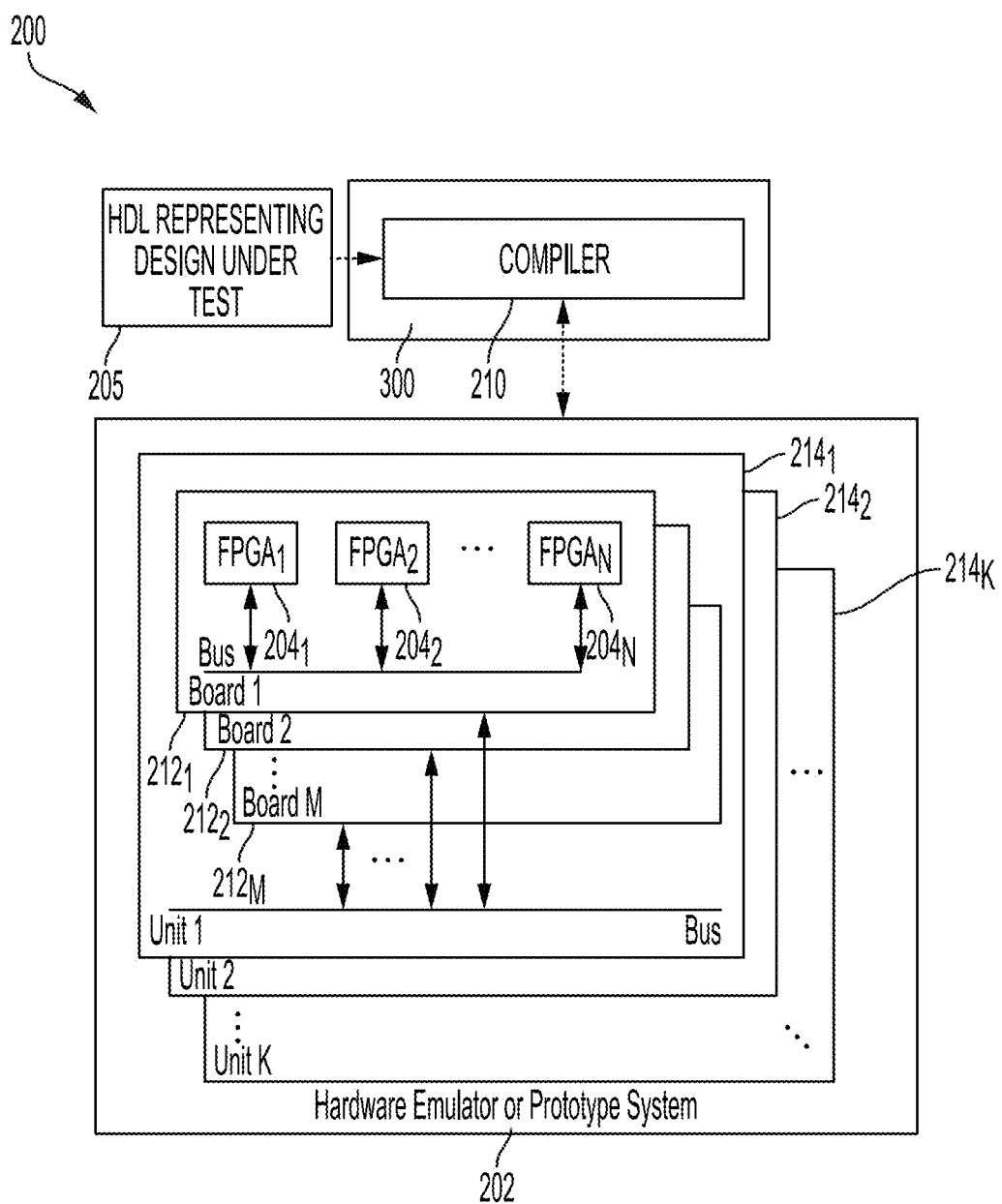
FIG. 12 is a block diagram of an emulation system.

An EDA software system, such as element 112 depicted in FIG. 10, typically includes an emulation system 116 to verify the functionality of the circuit design. FIG. 12 depicts a typical emulation system which includes a host computer system 300 (often part of an EDA system) and an emulator system 202 (typically a set of programmable devices such as Field Programmable Gate Arrays (FPGAs)). The host system generates data and information, typically using a compiler 210, to configure the emulator to emulate a circuit design. One of more circuit designs to be emulated are referred to as a DUT (Design Under Test). The emulator is a hardware system that emulates a DUT, for example, to use the emulation results for verifying the functionality of the DUT. One example of an emulation system that can be used for the embodiments disclosed herein is the ZeBu Server available from Synopsys, Inc.

The host system 300 comprises one or more processors. In the embodiment where the host system is comprised of multiple processors, the functions described herein as being performed by the host system may be distributed among the multiple processors.

The host system 300 typically includes a compiler 210 that processes code written in a hardware description language that represents a DUT, producing data (typically binary) and information that is used to configure the emulation system 202 to emulate the DUT. The compiler 210 may transform, change, reconfigure, add new functions to, and/or control the timing of the DUT.

The host system and emulator exchange data and information using signals carried by an emulation connection. The connection can be one or more electrical cables, for example, cables with pin configurations compatible with the RS232 or USB protocols. The connection can be a wired communication medium or network, such as a local area network, or a wide area network such as the Internet. The connection can be a wireless communication medium or a network with one or more points of access, using a wireless protocol such as Bluetooth® or IEEE 802.11. The host system and emulator can exchange data and information through a third device, such as a network server.

The emulator includes multiple FPGAs (or other programmable devices), for example, elements $204_1$ to $204_N$ in FIG. 12. Each FPGA can include one or more FPGA interfaces through which the FPGA is connected to other FPGAs of the emulator (and potentially other emulator hardware components), in order for the FPGAs to exchange signals. An FPGA interface may also be referred to as an input/output pin or an FPGA pad. While some embodiments disclosed herein make use of emulators comprising FPGAs, other embodiments can include other types of logic blocks instead of or along with, the FPGAs for emulating DUTs, for example, custom FPGAs, specialized ASICs for emulation or prototyping, memories, and input/output devices.

A programmable device may include an array of programmable logic blocks and a hierarchy of reconfigurable interconnects that allow the programmable logic blocks to be connected to each other according to the descriptions in the HDL code. Each of the programmable logic blocks can be configured to perform complex combinational functions, or merely simple logic gates, such as AND, and XOR logic blocks.

In many FPGAs, logic blocks also include memory elements, which may be simple latches, flip-flops or more complex blocks of memory. Depending on the length of the interconnections between different logic blocks, signals may arrive at input terminals of the logic blocks at different times.

Programmable processors $204_1$-$204_N$ may be placed into one or more hardware boards $212_1$ through $212_M$. Many of such boards may be placed into a hardware unit, e.g. $214_1$. The boards within a unit may be connected using the backplane of the unit or any other types of connections. In addition, multiple hardware units (e.g., $214_1$ through $214_K$) may be connected to each other by cables or any other means to form a multi-unit system. In general, the hardware emulation or prototype system 202 may be formed using a single board, a single unit with multiple boards, or with multiple units without departing from the teachings of the present disclosure.

For a DUT that is to be emulated, the emulator receives from the host system one or more bit files including a description of the DUT. The bit files further specify partitions of the DUT created by the host system with trace and injection logic, mappings of the partitions to the FPGAs of the emulator, and design constraints. Based on the bit files, the emulator configures the FPGAs to perform the functions of the DUT. With some emulators, one or more FPGAs of an emulator already have the trace and injection logic built into the silicon of the FPGA. For this type of emulator, the FPGAs don't have to be configured by the host system to emulate trace and injection logic.

The host system 110 receives (e.g., from a user or from a data store) a description of a DUT that is to be emulated. In one embodiment, the DUT description is in a hardware description language (HDL), such as register transfer language (RTL). In another embodiment, the DUT description is in netlist level files, or a mix of netlist level files and HDL files. If part of the DUT description or the entire DUT description is in a HDL, the host system synthesizes the DUT description to create a gate level netlist based on the DUT description. A host system can use the netlist of the DUT to partition the DUT into multiple partitions, with some of these partitions including trace and injection logic. The trace and injection logic traces interface signals exchanged via the interfaces of an FPGA. Additionally, the trace and injection logic can be used to inject traced interface signals into the logic of the FPGA. The host system maps each partition to an FPGA of the emulator. With some emulators, the trace and injection logic is only included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic was incorporated, the bit files also describe the incorporation of the logic. The bit files may also include place and route information and design constraints. The host system stores the bit files and also stores for components of the DUT information describing which FPGAs are to emulate each component of the DUT (to which FPGAs each component is mapped).

Upon request, the host system transmits the bit files to the emulator. The host system instructs the emulator to emulate the DUT. During emulation of the DUT or at the end of the emulation, the host system receives emulation results from the emulator through the emulation connection. Emulation results are data and information generated by the emulator based on the emulation of the DUT. The emulation results include interface signals (states of interface signals) traced by the trace and injection logic of each FPGA. The host system can stores the emulation results, or transmit them to another processing system.

After emulation of the DUT, a user may request to debug a component of the DUT. If such a request is made the user may provide a time period of the emulation to debug. The host system identifies which FPGAs are configured to emulate the component based on the stored information. The host system retrieves stored interface signals associated with the time period and traced by the trace and injection logic of each identified FPGA. The host system instructs the emulator to re-emulate the identified FPGAs, either one by one, multiple at a time, or altogether. The host system transmits the retrieved interface signals to the emulator in order to re-emulate the component for the time period. The trace and injection logic of each identified FPGA injects its respective interface signals received from the host system into the logic of the DUT mapped to the FPGA. In case of multiple re-emulations of an FPGA, the results may be merged all together to have a full debug view.

The host system receives from the emulator signals traced by logic of the identified FPGAs during the re-emulation of the component. The host system stores the signals received from the emulator. The signals traced during the re-emulation can have a higher sampling rate than during the initial emulation. For example, in the initial run a traced signal may be comprised of a saved hardware state every X milliseconds. However, in the re-emulation the traced signal may be comprised of a saved hardware state every Y milliseconds, where Y is less than X If the user requests to view a waveform of a signal traced during the re-emulation, the host system can retrieve the stored signal and display a plot of the signal (generates a waveform of the signal). Afterwards the user can, for example, request to re-emulate the same component but for a different time period or to re-emulate another component.

A host system typically comprises at least seven sub-systems: a design synthesizer, a mapping module, a run time module, a results module, a debug module, a waveform module, and a storage module. Each of these sub-systems may be embodied as hardware, software, firmware, or a combination thereof. Together these components configure the emulator, and monitor the emulation results.

The design synthesizer converts the HDL of a DUT into gate level logic. For a DUT that is to be emulated, the design synthesizer receives a description of the DUT. If the description of the DUT is fully or partially in HDL (e.g., RTL or other level of abstraction), the design synthesizer 210 synthesizes the HDL of the DUT to create a gate-level netlist with a description of the DUT in terms of gate level logic.

The mapping module partitions DUTs and maps partitions to emulator FPGAs. The mapping module partitions a DUT at the gate level into a number of partitions using the netlist of the DUT. For each partition, the mapping module retrieves a gate level description of the trace and injection logic and incorporates the logic into the partition. As described above, the trace and injection logic included in a partition is configured to trace signals exchanged via the interfaces of an FPGA to which the partition is mapped (trace interface signals). The trace and injection logic can be incorporated into the DUT prior to the partitioning. For example, the trace and injection logic may be incorporated by the design synthesizer prior to or after the synthesizing the HDL of the DUT. Hence, the trace and injection logic may not match the partitions, it may be a subset, a superset or even different from the partitions.

In addition to including the trace and injection logic, the mapping module may include additional tracing logic in a partition in order to trace the states of certain DUT components that are not traced by the trace and injection logic (to trace signals other than the interface signals traced by the trace and injection logic). The mapping module may include the additional tracing logic in the DUT prior to the partitioning or in partitions after the partitioning. The design synthesizer can include the additional tracing logic in an HDL description of the DUT prior to synthesizing the description.

The mapping module maps each partition of the DUT to an FPGA of the emulator. The mapping module performs the partitioning and mapping using design rules, design constraints (e.g., timing or logic constraints), and information about the emulator. For components of the DUT, the mapping module stores information in the storage module describing which FPGAs are to emulate each component.

Based on the partitioning and the mapping, the mapping module generates one or more bit files that describe the created partitions and the mapping of logic to each FPGA of the emulator. The bit files may include additional information, such as constraints of the DUT, and routing information of connections between FPGAs and connections within each FPGA. The mapping module can generate a bit file for each partition of the DUT, which can be stored in the storage module. Upon request from a user, the mapping module transmits the bit files to the emulator, which the emulator uses to configure the FPGAs to emulate the DUT.

If the emulator includes specialized ASICs that include the trace and injection logic, the mapping module may generate a specific configuration allowing to connect them to the DUT or just save the information of what traced/injected signal is and where the information is stored on the specialized ASIC.

The run time module controls emulations performed on the emulator. The run time module may cause the emulator to start or stop executing an emulation. Additionally, the run time module may provide input signals/data to the emulator. The input signals may be provided directly to the emulator through the connection or indirectly through other input signal devices. For example, the host system with the run time module may control an input signal device to provide the input signals to the emulator. The input signal device may be, for example, a test board (directly or through cables), signal generator, another emulator, or another host system.

The results module processes emulation results generated by the emulator. During emulation and/or after completing the emulation, the results module receives emulation results from the emulator generated during the emulation. The emulation results include signals traced during the emulation. Specifically, the emulation results include interface signals traced by the trace and injection logic emulated by each FPGA. The emulation results may also include signals traced by additional logic included in the DUT. Each traced signal can span multiple cycles of the emulation. A traced signal is comprised of multiple hardware states and each hardware state is associated with a time of the emulation. The results module stores the traced signals received in the storage module. For each stored signal, the results module can store information indicating which FPGA generated the traced signal.

The debug module allows users to debug DUT components. After the emulator has emulated a DUT and the results module has received the interface signals traced by the trace and injection logic during the emulation, a user may request to debug a component of the DUT by re-emulating the component for a specific time period. In a request to debug a component, the user identifies the component and indicates a time period of the emulation to debug. The user's request can also include a sampling rate that indicates how often hardware states should be saved by logic that traces signals.

The debug module identifies the one or more FPGAs of the emulator that are configured to emulate the component based on the information stored by the mapping module in the storage module. For each identified FPGA, the debug module retrieves, from the storage module, interface signals traced by the trace and injection logic of the FPGA during the time period indicated by the user (i.e., retrieve hardware states traced by the trace and injection logic that are associated with the time period).

The debug module transmits the retrieved interface signals to the emulator. The debug module instructs the debug module to run the identified FPGAs and for the trace and injection logic of each identified FPGA to inject its respective traced signals into logic of the FPGA in order to re-emulate the component for the requested time period. The debug module can also transmit the sampling rate provided by the user to the emulator so that the tracing logic traces hardware states at the proper intervals.

To debug the component, the emulator only has to run the FPGAs to which the component has been mapped. Additionally, the re-emulation of the component does not have to start from the beginning but can start at any point desired by the user.

For an identified FPGA, the debug module can transmit instructions to the emulator to load multiple emulator FPGAs with the same configuration of the identified FPGA. The debug module additionally instructs the emulator to run the multiple FPGAs in parallel. Each FPGA from the multiple FPGAs is run with a different time window of the interface signals in order to generate a larger time window in a shorter amount of time. For example, for the identified FPGA to run a certain amount of cycles it may take an hour. However, if multiple FPGAs are loaded with the configuration of the identified FPGA and each of the FPGAs runs a subset of the cycles, it may only take a few minutes for the FPGAs to collectively run all of the cycles.

A user may identify a hierarchy or a list of DUT signals to re-emulate. To enable this, the debug module determines the FPGA needed to emulate the hierarchy or list of signals, retrieves the necessary interface signals and transmits the retrieved interface signals to the emulator for re-emulation. Hence, a user can identify any element (e.g., component or signal) of the DUT to debug/re-emulate.

The waveform module generates waveforms based on traced signals. If a user requests to view a waveform of a signal traced during an emulation run, the host system retrieves the signal from the storage module. The waveform module displays a plot of the signal to the user. For one or more signals, when the signals are received from the emulator, the waveform module can automatically generate the plots of the signals.

DETAILED DESCRIPTION—SEMANTIC SUPPORT

The signifier 'commercial solution' signifies, solely for the following paragraph, an engineering domain-specific (and thus non-preemptive—see Bilski) electronic structure, process for specified machines, manufacturable circuit (and their Church-Turing equivalents) or composition of matter that is useful in commerce to solve a problem of technology, that is, a use in commerce of an application of science or use in commerce of technology.

The signifier 'abstract' (when used in a patent claim for any embodiments disclosed herein for a new commercial solution that is a scientific application of one or more laws of nature {see Benson}, and that solves a problem of technology {see Diehr} used in commerce—or improves upon an existing commercial solution {see Diehr})—is precisely defined by the inventor(s) {see MPEP 2111.01} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is "difficult to understand" {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art items that can be combined {see Alice} by a person having ordinary skill in the art {a "PHOSITA", see MPEP 2141-2144} to be equivalent to the new commercial solution, and is thus unpatentable under 35 U.S.C. 103, for example, because it is "difficult to understand" how the new commercial solution differs from a PHOSITA-combination/-application of the existing prior art; or c) a new commercial solution is 'abstract' if it is not disclosed with an enabling description either because there is insufficient guidance in the enabling description, or because only a generic implementation is described {see Mayo} with unspecified elements, parameters or functionality, so that a PHOSITA is unable to instantiate a useful embodiment of the new commercial solution, without, for example, requiring special programming {see Katz} or circuit design to be performed by the PHOSITA), and is thus unpatentable under 35 U.S.C. 112, for example, because it is "difficult to understand" how to use in commerce any embodiment of the new commercial solution.

DETAILED DESCRIPTION—CONCLUSION

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosto signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed:

1. A hardware emulation system comprising at least one processor and at least one memory storing instructions that cause the system to:
receive a netlist of a circuit;
transform said netlist of the circuit to a directed graph:
identify one or more loops within the directed graph by identifying one or more strongly connected components (SCC) in the directed graph, wherein each of the one or more SCC comprises a plurality of vertices and a plurality of edges connecting the plurality of vertices;
replace n edges of the SCC with n loop breakers, wherein n is greater than 0;
apply constant values of 1s and 0s to the n loop breakers to generate $2^n$ netlists; and
perform a hardware emulation based on the $2^n$ netlists to detect one or more of an oscillation status and a state holding status using an oscillation detector and a state-holding detector.

2. The hardware emulation system of claim 1, wherein the hardware emulation system detects oscillation in accordance with the following expression:

$$OSC(Y) = \sim \sum_{S \in B^n} \left( \prod_{k=1}^{n} \delta(S[k], g_k^S(Y)) \right).$$

wherein Y is a vector of Boolean variables, wherein "~" represents a negation operation, wherein B" represents a Boolean function having n variables, wherein δ is defined as:

$$\delta: (x \in B, f) \xrightarrow{yields} \begin{array}{l} f \; iff \; x = 1 \\ \sim f \; iff \; x = 0 \end{array}$$

wherein x is an element of Boolean set {0,1} and f is a Boolean function, wherein S is an element of B", wherein $g^S(Y)$ represents the Boolean function from Y to B, and wherein k is an index varying from 1 to n, and wherein the S[k] represents the kth Boolean value of the n-tuple S belonging to B".

3. The hardware emulation system of claim 1, wherein the hardware emulation system detects state holding in accordance with the following expression:

$$STH(Y) = \sum_{\substack{S_0, S_1 \in B^n \\ S_0 < S_1}} \left( \prod_{k=1}^{n} \delta(S_0[k], g_k^{S_0}(Y)) * \prod_{k=1}^{n} \delta(S_1[k], g_k^{S_1}(Y)) \right).$$

wherein Y is a vector of Boolean variables, wherein "~" represents a negation operation, wherein B" represents a Boolean function having n variables, wherein δ is defined as:

$$\delta: (x \in B, f) \xrightarrow{yields} \begin{array}{l} f \; iff \; x = 1 \\ \sim f \; iff \; x = 0 \end{array}$$

wherein x is an element of Boolean set {0,1} and f is a Boolean function, wherein $S_0$ and $S_1$ are elements of B", wherein $S_0$ is smaller than $S_1$, wherein $g^S(Y)$ represents the Boolean function from Y to B, wherein k is an index varying from 1 to n, wherein $S_0$[k] represent the kth Boolean value of the n-tuple $S_0$ belonging to B", wherein $S_1$[k] represent the kth Boolean value of the n-tuple $S_1$ belonging to B", and wherein * represents a multiplication operation.

4. A method for circuit loop detection via circuit emulation, the method comprising:
receiving a netlist of a circuit;
transforming said netlist to a directed graph;
identify one or more loops within the directed graph by identifying one or more strongly connected components (SCC) in the directed graph, wherein each of the one or more SCC comprises a plurality of vertices and a plurality of edges connecting the plurality of vertices;
replacing n edges of the SCC with n loop breakers, wherein n is greater than 0;
applying constant values of 1s and 0s to the n loop breakers to generate $2^n$ netlists; and
performing a hardware emulation based on the $2^n$ netlists to detect one or more of an oscillation status and a state holding status using an oscillation detector and a state-holding detector.

5. The method of claim 4, wherein the oscillation detection is performed in in accordance with the following expression:

$$OSC(Y) = \sim \sum_{S \in B^n} \left( \prod_{k=1}^{n} \delta(S[k], g_k^S(Y)) \right)$$

wherein Y is a vector of Boolean variables, wherein "~" represents a negation operation, wherein B" represents a Boolean function having n variables, wherein δ is defined as:

$$\delta: (x \in B, f) \xrightarrow{yields} \begin{array}{l} f \; iff \; x = 1 \\ \sim f \; iff \; x = 0 \end{array}$$

wherein x is an element of Boolean set {0,1} and f is a Boolean function, wherein S is an element of B", wherein $g^S(Y)$ represents the Boolean function from Y to B, and wherein k is an index varying from 1 to n, and wherein the S[k] represents the kth Boolean value of the n-tuple S belonging to B".

6. The method of claim 4, wherein the state holding detection is performed in in accordance with the following expression:

$$STH(Y) = \sum_{\substack{S_0, S_1 \in B^n \\ S_0 < S_1}} \left( \prod_{k=1}^{n} \delta(S_0[k], g_k^{S_0}(Y)) * \prod_{k=1}^{n} \delta(S_1[k], g_k^{S_1}(Y)) \right)$$

wherein Y is a vector of Boolean variables, wherein "~" represents a negation operation, wherein B" represents a Boolean function having n variables, wherein δ is defined as:

$$\delta: (x \in B, f) \xrightarrow{yields} \begin{array}{l} f \; iff \; x = 1 \\ \sim f \; iff \; x = 0 \end{array}$$

Wherein x is an element of Boolean set {0,1} and f is a Boolean function, wherein S is an element of B", wherein $g^S(Y)$ represents the Boolean function from Y to B, and wherein k is an index varying from 1 to n, and wherein the S[k] represents the kth Boolean value of the n-tuple S belonging to B".

7. A non-transitory computer-readable storage medium comprising executable instructions configured to, when executed by a processor, cause the processor to:
receive a netlist of a circuit:
transform the netlist to a directed graph:
identify one or more loops within the directed graph by identifying one or more strongly connected components (SCC) in the directed graph, wherein each of the one or more SCC comprises a plurality of vertices and a plurality of edges connecting the plurality of vertices;
replace n edges of the SCC with n loop breakers, wherein n is greater than 0;
apply constant values of 1s and 0s to the n loop breakers to generate $2^n$ netlists; and
perform a hardware emulation based on the $2^n$ netlists to detect one or more of an oscillation status and a state holding status using an oscillation detector and a state-holding detector.

8. The non-transitory computer readable medium of claim 7, wherein the oscillation is detected in accordance with the following expression:

$$OSC(Y) = \sim \sum_{S \in B^n} \left( \prod_{k=1}^{n} \delta(S[k], g_k^S(Y)) \right)$$

wherein Y is a vector of Boolean variables, wherein "~" represents a negation operation, wherein $B^n$ represents a Boolean function having n variables, wherein δ is defined as:

$$\delta: (x \in B, f) \xrightarrow{\text{yields}} \begin{array}{l} f \text{ iff } x = 1 \\ \sim f \text{ iff } x = 0 \end{array}$$

wherein x is an element of Boolean set $\{0,1\}$ and f is a Boolean function, wherein S is an element of $B^n$, wherein $g^S(Y)$ represents the Boolean function from Y to B, and wherein k is an index varying from 1 to n, and wherein the S[k] represents the kth Boolean value of the n-tuple S belonging to $B^n$.

9. The non-transitory computer readable medium of claim 7, wherein the state holding is detected in accordance with the following expression:

$$STH(Y) = \sum_{\substack{S_0, S_1 \in B^n \\ S_0 < S_1}} \left( \prod_{k=1}^{n} \delta(S_0[k], g_k^{S_0}(Y)) * \prod_{k=1}^{n} \delta(S_1[k], g_k^{S_1}(Y)) \right)$$

wherein Y is a vector of Boolean variables, wherein "~" represents a negation operation, wherein $B^n$ represents a Boolean function having n variables, wherein δ is defined as:

$$\delta: (x \in B, f) \xrightarrow{\text{yields}} \begin{array}{l} f \text{ iff } x = 1 \\ \sim f \text{ iff } x = 0 \end{array}$$

wherein x is an element of Boolean set $\{0,1\}$ and f is a Boolean function, wherein S is an element of $B^n$, wherein $g^S(Y)$ represents the Boolean function from Y to B, and wherein k is an index varying from 1 to n, and wherein the S[k] represents the kth Boolean value of the n-tuple S belonging to $B^n$.

* * * * *